(12) United States Patent
Howe et al.

(10) Patent No.: US 10,745,065 B2
(45) Date of Patent: Aug. 18, 2020

(54) VEHICLE WITH PNEUMATICALLY SUSPENDED OPERATOR COMPARTMENT

(71) Applicant: Howe and Howe Technologies, Inc., Waterboro, ME (US)

(72) Inventors: Geoffrey Howe, North Berwick, ME (US); Michael Howe, Limerick, ME (US)

(73) Assignee: Howe & Howe Inc., Waterboro, ME (US)

( * ) Notice: Subject to any disclaimer, the term of this patent is extended or adjusted under 35 U.S.C. 154(b) by 240 days.

(21) Appl. No.: 15/953,836

(22) Filed: Apr. 16, 2018

(65) Prior Publication Data

US 2019/0315413 A1 Oct. 17, 2019

(51) Int. Cl.
*B62D 33/06* (2006.01)
*B62D 55/06* (2006.01)
(Continued)

(52) U.S. Cl.
CPC ......... *B62D 33/0608* (2013.01); *B62D 55/06* (2013.01); *B62D 55/108* (2013.01);
(Continued)

(58) Field of Classification Search
CPC ..... B62D 33/608; B62D 33/604; B62D 33/10
See application file for complete search history.

(56) References Cited

U.S. PATENT DOCUMENTS

| 363,378 A | * | 5/1887 | Fay | ........................... | B61F 5/14 |
| | | | | | 105/453 |
| 2,913,252 A | | 11/1959 | Norrie | | |

(Continued)

FOREIGN PATENT DOCUMENTS

WO    9854044 A1    12/1998

OTHER PUBLICATIONS

"About Air Suspension" Air Lift advertisement; downloaded from the Internet on Jan. 7, 2018 at <http://www.airliftcompany.com/workshop/air-suspension/>.

*Primary Examiner* — Jacob D Knutson
*Assistant Examiner* — Conan D Duda
(74) *Attorney, Agent, or Firm* — BainwoodHuang

(57) ABSTRACT

An overland vehicle is provided which includes a chassis with a roll-over protection structure, a powertrain configured to generate power to drive the overland vehicle, a first suspension system configured as a chassis to ground suspension system, and an operator compartment. The vehicle may also include a second suspension system configured to pneumatically suspend the operator compartment within the chassis, where the second suspension system includes a plurality of pneumatic couplers, including at least a first pneumatic coupler suspending the operator compartment to the chassis along a first vector extending in a first direction, and a second countering pneumatic coupler suspending the operator compartment to the chassis along a second vector extending in a second direction, where the second direction is generally opposite the first direction. In another embodiment, the second suspension system may include a plurality of spaced apart pneumatic couplers, including at least a first pneumatic coupler suspending the operator compartment to a first side of the chassis, and a second pneumatic coupler suspending the operator compartment to a second side of the chassis.

17 Claims, 7 Drawing Sheets

(51) Int. Cl.
   *B62D 55/108* (2006.01)
   *B62D 55/24* (2006.01)
   *F16F 15/023* (2006.01)
   *B62D 55/14* (2006.01)

(52) U.S. Cl.
   CPC ............ *B62D 55/14* (2013.01); *B62D 55/24* (2013.01); *F16F 15/0232* (2013.01); *F16F 2230/0011* (2013.01)

(56) References Cited

U.S. PATENT DOCUMENTS

| | | | | |
|---|---|---|---|---|
| 3,420,568 A * | 1/1969 | Henriksson | B62D 33/0604 | 296/35.1 |
| 3,690,720 A * | 9/1972 | Whisler | B60G 99/002 | 296/190.03 |
| 3,747,956 A * | 7/1973 | Heberlein | A63B 19/02 | 280/206 |
| 3,841,694 A * | 10/1974 | Merkle | B62D 27/04 | 296/35.1 |
| 3,917,339 A * | 11/1975 | Fritz | B60N 2/4214 | 296/68.1 |
| 3,944,017 A | 3/1976 | Foster | | |
| 3,973,796 A * | 8/1976 | Suzuki | B62D 27/04 | 296/190.07 |
| 4,033,607 A | 7/1977 | Cameron | | |
| 4,050,733 A * | 9/1977 | Borrill | B62D 33/0604 | 296/204 |
| 4,099,763 A * | 7/1978 | Maier | B60R 21/131 | 296/190.08 |
| 4,114,923 A | 9/1978 | Raidel | | |
| 4,235,470 A * | 11/1980 | Kauss | B62D 33/0604 | 180/89.12 |
| 4,265,328 A * | 5/1981 | Rowa | B62D 33/0604 | 180/89.13 |
| 4,271,921 A * | 6/1981 | Ochsner | B62D 33/0604 | 180/89.12 |
| 4,275,918 A * | 6/1981 | Franco | B62D 33/0604 | 180/89.12 |
| 4,330,149 A * | 5/1982 | Salmon | B62D 33/0604 | 296/190.05 |
| 4,372,411 A * | 2/1983 | Flower | B62D 33/07 | 180/89.15 |
| 4,379,572 A | 4/1983 | Hedenberg | | |
| 4,451,079 A * | 5/1984 | Takahashi | B62D 33/067 | 180/89.13 |
| 4,515,234 A * | 5/1985 | Loy | B62D 33/0604 | 180/89.12 |
| 4,556,117 A * | 12/1985 | Frey | E21F 13/025 | 180/89.13 |
| 4,616,725 A * | 10/1986 | McDaniel | B62D 33/0604 | 175/219 |
| 4,807,713 A * | 2/1989 | Smith | B62D 33/0608 | 180/89.14 |
| 5,139,104 A * | 8/1992 | Moscicki | B62D 33/0608 | 180/328 |
| 5,207,408 A * | 5/1993 | Burg | B63B 29/02 | 114/284 |
| 5,368,119 A * | 11/1994 | Nystrom | B62D 33/0608 | 180/89.13 |
| 6,059,253 A * | 5/2000 | Koutsky | B60N 2/501 | 248/550 |
| 6,158,690 A | 12/2000 | Wadey et al. | | |
| 6,206,121 B1 * | 3/2001 | Michel | B60G 17/025 | 180/89.13 |
| 6,206,422 B1 * | 3/2001 | Goddard | B62D 33/0604 | 280/788 |
| 6,340,201 B1 * | 1/2002 | Higuchi | B62D 33/0604 | 296/190.07 |
| 6,375,203 B1 | 4/2002 | Warinner et al. | | |
| 6,408,970 B1 * | 6/2002 | Eng | B60G 99/006 | 180/89.12 |
| 6,439,651 B1 * | 8/2002 | Johansson | B62D 33/067 | 180/89.12 |
| 6,467,581 B2 * | 10/2002 | Bavendiek | B62D 33/0608 | 180/89.12 |
| 6,540,283 B1 * | 4/2003 | Johansson | B62D 33/067 | 180/89.14 |
| 6,726,272 B1 * | 4/2004 | Puterbaugh | B60G 99/00 | 296/190.01 |
| 7,228,927 B2 * | 6/2007 | Hass | B60K 6/46 | 180/65.25 |
| 7,237,830 B1 * | 7/2007 | Smith | B62D 33/0604 | 180/89.12 |
| 7,410,207 B2 * | 8/2008 | Fornell | B62D 33/077 | 296/190.03 |
| 7,416,243 B2 * | 8/2008 | Dammann | B62D 21/152 | 296/187.03 |
| 7,594,561 B2 * | 9/2009 | Hass | F41H 7/02 | 180/299 |
| 8,313,121 B2 | 11/2012 | Rolfe et al. | | |
| 8,430,426 B2 | 4/2013 | Rasset et al. | | |
| 8,678,477 B2 * | 3/2014 | Husson | B62D 33/0608 | 180/89.14 |
| 8,777,125 B2 * | 7/2014 | Honermann | A01M 7/0082 | 137/343 |
| 8,857,834 B2 * | 10/2014 | Van der Knaap | B60G 21/051 | 280/124.103 |
| 8,870,203 B2 | 10/2014 | Legros | | |
| 10,112,657 B2 * | 10/2018 | Bumueller | B62D 33/0604 | |
| 10,569,813 B2 * | 2/2020 | Davis | B60G 17/08 | |
| 2002/0113463 A1 * | 8/2002 | Gross | B60G 15/14 | 296/190.07 |
| 2005/0051373 A1 * | 3/2005 | Bernhardt | B62D 33/0608 | 180/89.12 |
| 2006/0255623 A1 * | 11/2006 | Haller | B60G 17/0155 | 296/190.07 |
| 2007/0131470 A1 * | 6/2007 | Fujiwara | B62D 33/0604 | 180/311 |
| 2007/0267894 A1 * | 11/2007 | Van Den Brink | B62D 33/0604 | 296/190.07 |
| 2009/0045000 A1 * | 2/2009 | Brown | B62D 33/0608 | 180/89.12 |
| 2009/0167057 A1 | 7/2009 | Walter et al. | | |
| 2010/0237656 A1 * | 9/2010 | Haller | B60G 17/0155 | 296/190.07 |
| 2011/0025097 A1 * | 2/2011 | Yamamoto | B62D 33/0604 | 296/190.03 |
| 2012/0098227 A1 * | 4/2012 | Holst | B60G 7/003 | 280/124.106 |
| 2012/0193157 A1 * | 8/2012 | Rasset | B60R 21/131 | 180/89.13 |
| 2013/0009423 A1 * | 1/2013 | Yamamoto | B62D 33/0604 | 296/190.08 |
| 2014/0042776 A1 * | 2/2014 | Leeder | B62D 33/077 | 296/190.07 |
| 2014/0292014 A1 * | 10/2014 | Christianson | B62D 33/0604 | 296/35.3 |
| 2014/0319876 A1 * | 10/2014 | Schauer | B62D 33/0608 | 296/190.07 |
| 2014/0358380 A1 * | 12/2014 | Rausch | B62D 33/073 | 701/49 |
| 2015/0130218 A1 * | 5/2015 | Levin | B60N 2/502 | 296/187.09 |
| 2016/0257352 A1 * | 9/2016 | Colbert | B60R 3/00 | |
| 2017/0247064 A1 * | 8/2017 | Scott | B62D 33/0604 | |
| 2017/0297713 A1 | 10/2017 | Hegenbart et al. | | |
| 2018/0029651 A1 * | 2/2018 | Wagner | B62D 33/0608 | |
| 2018/0178856 A1 * | 6/2018 | Davis | B60G 17/01908 | |
| 2018/0281551 A1 * | 10/2018 | Ballaire | B60G 17/04 | |
| 2019/0023328 A1 * | 1/2019 | Yamanaka | B62D 33/0604 | |
| 2019/0161127 A1 * | 5/2019 | Payne | B62D 25/12 | |

* cited by examiner

US 10,745,065 B2

VEHICLE WITH PNEUMATICALLY SUSPENDED OPERATOR COMPARTMENT

FIELD

This disclosure relates generally to an overland vehicle having a suspension system that pneumatically suspends the operator compartment to the vehicle chassis.

BACKGROUND

Some overland vehicles are designed for rugged and/or off-road applications including, but not limited to commercial, military and construction applications. These vehicles may be tracked or wheeled vehicles and they typically include an operator compartment designed to hold one or more occupants in the vehicle.

The operator compartment is fixed to the vehicle's chassis and it may be integrally formed with the vehicle's chassis. A powertrain is coupled to the chassis to generate power to drive the vehicle. A conventional suspension system, also known as a "chassis to ground" suspension system, is designed to provide relative motion between the chassis and the ground to keep the tracks/wheels in contact with the ground while also maintaining ride quality for the vehicle's occupants.

SUMMARY

In one embodiment, an overland vehicle is provided. The overland vehicle includes a chassis including a roll-over protection structure, a powertrain coupled to the chassis, where the powertrain is configured to generate power to drive the overland vehicle, and a first suspension system configured as a chassis to ground suspension system. The vehicle also includes an operator compartment and a second suspension system configured to pneumatically suspend the operator compartment within the chassis. The second suspension system includes a plurality of pneumatic couplers, including at least a first pneumatic coupler suspending the operator compartment to the chassis along a first vector extending in a first direction, and a second countering pneumatic coupler suspending the operator compartment to the chassis along a second vector extending in a second direction, where the second direction is generally opposite the first direction.

In another embodiment, an overland vehicle is provided. The overland vehicle includes a chassis including a roll-over protection structure having a plurality of sides, including at least a first side and a second side, a powertrain coupled to the chassis, where the powertrain is configured to generate power to drive the overland vehicle, and a first suspension system configured as a chassis to ground suspension system. The vehicle also includes an operator compartment and a second suspension system configured to pneumatically suspend the operator compartment within the chassis such that the operator compartment is positioned between the first side and the second side of the chassis. The second suspension system includes a plurality of spaced apart pneumatic couplers, including at least a first pneumatic coupler suspending the operator compartment to the first side of the chassis, and a second pneumatic coupler suspending the operator compartment to the second side of the chassis.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

DETAILED DESCRIPTION

Figure 1:
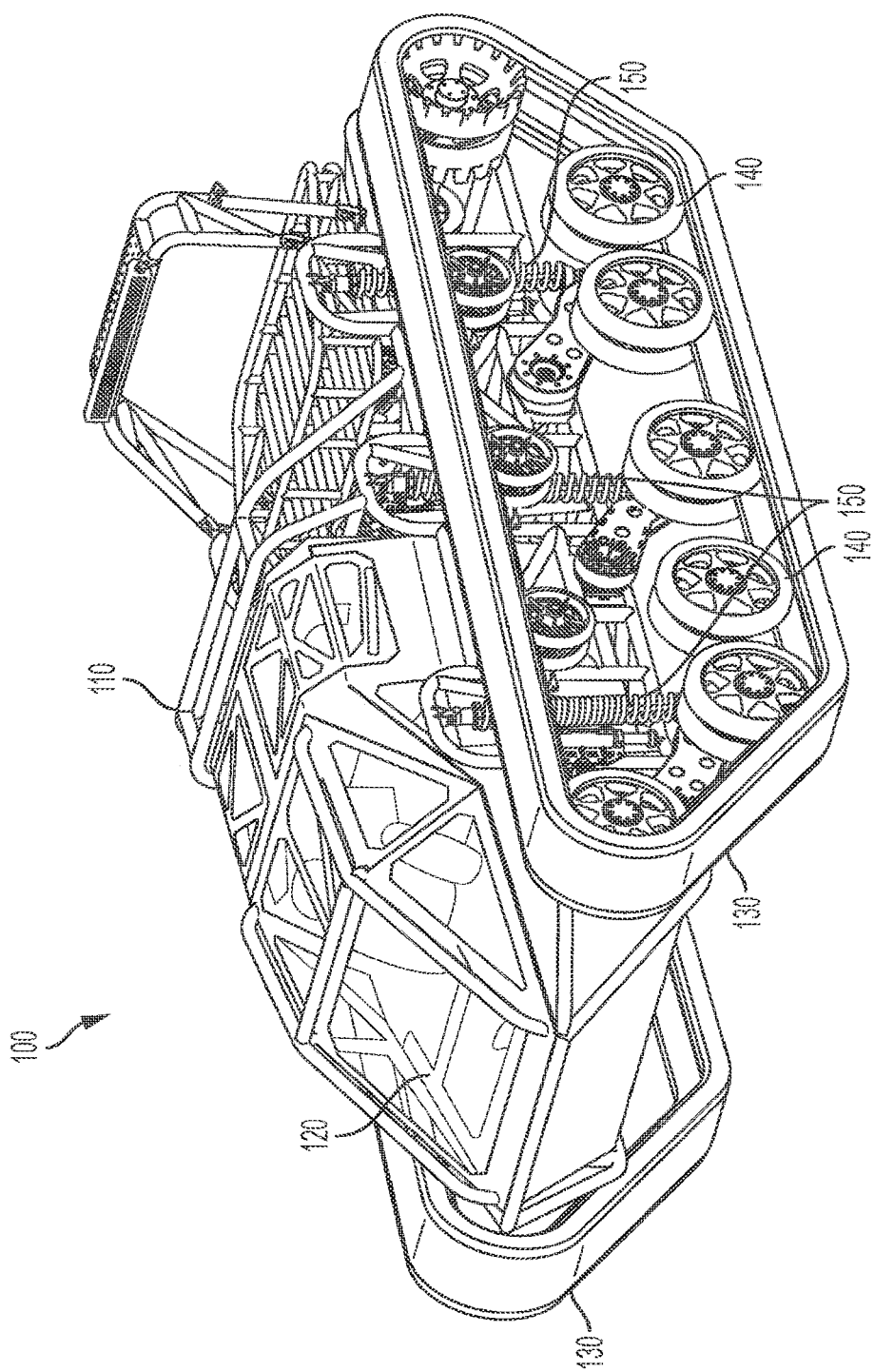
FIG. 1 is a schematic perspective view of an exemplary embodiment of an overland vehicle.

The following detailed description refers to the accompanying drawings. The same or similar reference numbers may be used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

Various embodiments disclose features of versatile overland vehicles. In some embodiments, a versatile off-road vehicle is called a Ripsaw™, and one example is Ripsaw F4™ manufactured by Howe and Howe Technologies located in Waterboro, Me.

As discussed in greater detail below, aspects of the present disclosure are directed to an overland vehicle with a suspension system configured to pneumatically suspend the operator compartment within the chassis. In one embodiment, the operator compartment may hang downwardly from portions of the chassis such that the operator compartment is free-floating. One benefit of this suspension system is that it may isolate the operator compartment from noise, vibration and/or overall harshness. For example, with an overland vehicle, there may be a large amount of vibration developed by the vehicle tracks and/or by the vehicle wheels, particularly as the vehicle passes over uneven terrain. These vibrations generally increase with speed and can create more noise and harshness. As set forth in more detail below, in one embodiment, by suspending the operator compartment within the vehicle's chassis, these noises, vibrations, and overall harsh conditions can be minimized and even eliminated, thus improving the quality of the ride and overall user experience in the operator compartment.

Turning now to the drawings, FIG. 1 illustrates one embodiment of an overland vehicle 100. As shown, the vehicle 100 includes a chassis 110 and an operator compartment 120. The operator compartment is configured to hold the operator/driver of the vehicle. As shown in FIG. 1, in one embodiment, the operator compartment 120 is configured to also hold one or more passengers. In one embodiment, the operator compartment is made of a lightweight aluminum alloy and may have seating for a plurality of occupants (for example, one driver and up to three passengers). One of ordinary skill in the art will appreciate that the operator compartment may be configured differently as the disclosure is not limited in this respect.

The chassis 110 includes a roll-over protection structure. In one embodiment, the roll-over protection structure includes a roll-over bar, which may have a substantially U-shape, and which is configured to extend around the operator compartment 120 to protect the operator in the event that the vehicle rolls off of its wheels/tracks. As shown in FIG. 1, in another embodiment, the chassis roll-over protection structure includes a plurality of tubes which form a framework that substantially surrounds the operator compartment 120. In one embodiment, the chassis 110 may be made of approximately two inch diameter DOM round steel tubes; however other sizes and materials are also contemplated as the disclosure is not limited in this respect. One of ordinary skill in the art would appreciate that the chassis 110 may include any conventional roll-over structure as the disclosure is not so limited.

As set forth in more detail below, the operator compartment 120 is pneumatically suspended within the chassis 110. Further details on this suspension system and the configuration of the chassis 110 are discussed below.

A powertrain (hidden below the operator compartment in FIG. 1) is coupled to the chassis 110 and is configured to generate power to drive the vehicle. In one embodiment, the powertrain includes an engine such as the Edelbrock/Musi 555CI Big Block Chevy (723 hp and 652 ft-lbs), and a transmission such as the Rossler Turbo Hydramatic 400 Automatic Transmission. In one embodiment, the powertrain also includes a heating/cooling system such as the Webasto engine coolant heater/circulator, and the powertrain may also include a quiet exhaust system. In one embodiment, the powertrain further includes a minimum fuel cell capacity of 50 gallons. One of ordinary skill in the art will appreciate that the powertrain may be configured differently as the disclosure is not limited in this respect. Furthermore, one of ordinary skill in the art will appreciate that the powertrain is a conventional vehicle component and thus the details of this component need not be further discussed.

As illustrated in FIG. 1, the vehicle 100 has a first suspension system 150 which is a chassis to ground suspension system. As shown in FIG. 1, in one embodiment, the first suspension system 150 may include a series of helical springs spaced around the periphery of the chassis 110. The present disclosure also contemplates other types of chassis to ground suspension systems as the disclosure is not limited in this respect. As discussed above in the Background Section of this disclosure, this chassis to ground suspension system is configured to provide relative motion between the chassis and the ground to keep the tracks/wheels of the vehicle in contact with the ground while also maintaining ride quality for the vehicle's occupants. One of ordinary skill in the art will appreciate that the first suspension system 150 may be configured differently as the disclosure is not limited in this respect. Also, one of ordinary skill in the art will also appreciate that the first suspension system 150 is a conventional vehicle component and thus the details of this component need not be further discussed.

The vehicle 100 illustrated in FIG. 1 includes a plurality of tracks 130 coupled to the powertrain, and these tracks 130 are configured to selectively move the vehicle 100. The vehicle 100 disclosed in FIG. 1 also includes a plurality of wheels 140 coupled to the powertrain, and these wheels are configured to selectively move the vehicle 100. It should be appreciated that in the embodiment illustrated in FIG. 1, the wheels 140 and tracks 130 work together to move the vehicle. In other words, in this illustrative embodiment, the powertrain may initiate movement in the plurality of wheels 140 which in turn initiates movement of the plurality of tracks 130 to move the vehicle 100 across the terrain. Other configurations are also contemplated as the disclosure is not limited in this respect. For example, in one embodiment, the wheels 140 and tracks 130 may be configured differently from the embodiment illustrated in FIG. 1. Furthermore, in one embodiment, the overland vehicle may only have wheels 140 which are configured to selectively move the vehicle. In another embodiment, the overland vehicle may only have tracks 130 configured to selectively move the vehicle. One of ordinary skill in the art will also appreciate that the tracks 130 and wheels 140 are conventional vehicle components and thus the details of these components need not be further discussed.

Figure 2:
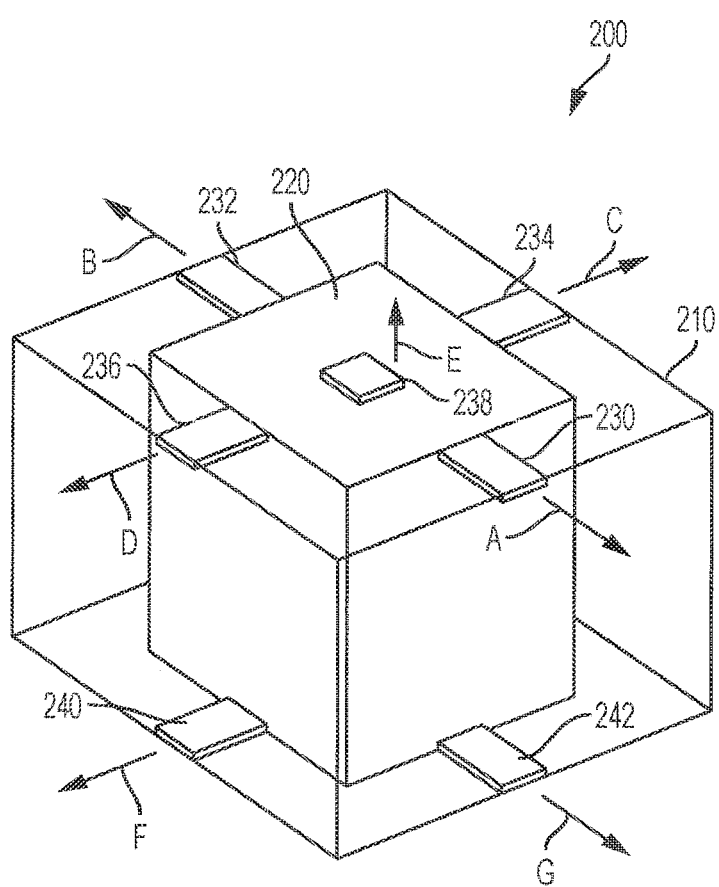
FIG. 2 is a schematic perspective view of an exemplary embodiment of a suspension system configured to pneumatically suspend an operator compartment within a chassis.

As mentioned above, aspects of the present disclosure are directed to a vehicle having a second suspension system configured to pneumatically suspend the operator compartment 120 within the chassis 110. This suspension system is illustrated in several vehicle embodiments discussed below, but first FIG. 2 illustrates a schematic view which provides an overview of this concept. In FIG. 2, the overland vehicle 200 includes an operator compartment 220 suspended within a chassis 210. For simplification, the operator compartment 220 is illustrated as a cube and the chassis 210 is illustrated as a substantially rectangular-shaped framework surrounding the operator compartment 220. One of ordinary skill in the art will appreciate that the shape and configuration of the operator compartment 220 and the chassis 210 may vary, as the disclosure is not limited in this respect.

In the embodiment illustrated in FIG. 2, the second suspension system includes a plurality of pneumatic couplers 230, 232, 234, 236, 238, 240, 242 which are configured to pneumatically suspend the operator compartment 220 within the chassis 210. In particular, there is a first pneumatic coupler 230 suspending the operator compartment 220 to the chassis 210 along a first vector A extending in a first direction, and a second countering pneumatic coupler 232 suspending the operator compartment 220 to the chassis 210 along a second vector B extending in a second direction. In this embodiment, the second vector B extends in a second direction which is generally opposite the first direction of the first vector A, such that the first pneumatic coupler 230 counters the second pneumatic coupler 232. In this particular illustrative embodiment, the direction of the first vector A is approximately 180° from the direction of the second vector B. However, as discussed below, other configurations and vector angles are also contemplated. For example, in another embodiment, a second pneumatic coupler may suspend the operator compartment to the chassis along a second vector B extending in a second direction, where the angle between vector A (associated with the first pneumatic coupler) and vector B is at least approximately 30°, 45°, 60°, 90°, 120°, 145°, 160°, or 180°.

In one embodiment, these countering pneumatic couplers 230, 232 help to balance each other. For example, as the vehicle 200 moves over uneven terrain, these countering pneumatic couplers 230, 232 in the secondary suspension system may help to control and/or minimize the motion of the operator compartment 220. In particular, as the vehicle is driven, various surrounding forces may move the operator compartment 220 toward one of the pneumatic couplers in a first direction along first vector A, but the opposite countering pneumatic coupler is designed to minimize this movement of the operator compartment 220 by providing a competing force in an opposing direction along second vector B.

In one embodiment, the first pneumatic coupler 230 suspends the operator compartment 220 to the chassis 210 along a first vector A which extends in a generally upward direction and the second pneumatic coupler 232 suspends the operator compartment 220 to the chassis 210 along a second vector B which extends in a generally opposite downward direction. In this embodiment, the first and second pneumatic couplers 230, 232 may be configured to balance out the gravitational forces on the operator compartment 220.

In another embodiment, the first pneumatic coupler 230 suspends the operator compartment 220 to the chassis 210 along a first vector A which extends in a generally fore direction and the second pneumatic coupler 232 suspends the operator compartment 220 to the chassis 210 along a second vector B which extends in a generally opposite aft direction. It should be noted that the fore and aft directions are generally defined based upon the orientation of the operator/driver in the operator compartment 220. In other words, the operator is generally facing the fore (i.e. front) of the vehicle. In this embodiment, the first and second pneumatic couplers 230, 232 may be configured to balance out the front to back forces on the operator compartment 220.

In yet another embodiment, the first pneumatic coupler 230 suspends the operator compartment 220 to the chassis 210 along a first vector A which extends in a generally left direction and the second pneumatic coupler 232 suspends the operator compartment 220 to the chassis 210 along a second vector B which extends in a generally opposite right direction. It should be noted that the directions left and right are generally defined based upon the orientation of the operator/driver in the operator compartment 220. In this embodiment, the first and second pneumatic couplers 230, 232 may be configured to balance out the side to side forces on the operator compartment 220.

As shown in FIG. 2, in one embodiment, the second suspension system may include more than two pneumatic couplers. For example, in one embodiment, the system includes a third pneumatic coupler 234 suspending the operator compartment 220 to the chassis 210 along a third vector C extending in a third direction, and a fourth countering pneumatic coupler 236 suspending the operator compartment 220 to the chassis 210 along a fourth vector D extending in a fourth direction. In this illustrative embodiment, the fourth vector D extends in a fourth direction which is generally opposite the third direction of the third vector C. In this particular illustrative embodiment, the direction of the third vector C is approximately 180° from the direction of the fourth vector D. Furthermore, in this illustrative embodiment, the third vector C and the fourth vector D are generally perpendicular to both the first vector A and the second vector B. As shown, the third vector C is approximately 90° from the direction of the first vector A, and the fourth vector D is approximately 90° from the direction of the second vector B. However, as discussed above, other configurations and vector angles are also contemplated.

As also shown in FIG. 2, in one embodiment, the second suspension system may further include a fifth pneumatic coupler 238 suspending the operator compartment 220 to the chassis 210 along a fifth vector E extending in a fifth direction, and a sixth countering pneumatic coupler (hidden behind the operator compartment 220) suspending the operator compartment 220 to the chassis 210 along a sixth vector extending in a fourth direction which is generally opposite the direction of the fifth vector E. In this particular embodiment, the direction of the fifth vector E is approximately 180° from the direction of the sixth vector, but as discussed below, other configurations are also contemplated.

In other words, when the operator compartment 220 is simplified to a six sided cube-shape, these pneumatic couplers may be suspending the operator compartment 220 within the chassis 210 on more than one of its six sides. In the embodiment illustrated in FIG. 2, the pneumatic couplers suspend the operator compartment 220 within the chassis 210 on all six sides of the operator compartment. The present disclosure also contemplates embodiments where the pneumatic couplers are located on one, two, three, four and five sides of the operator compartment 220 as the disclosure is not so limited.

As shown in FIG. 2, the second suspension system may also include multiple spaced apart pneumatic couplers which suspend the operator compartment 220 within the chassis 210 along the same side of the chassis (i.e. along the same direction). For example, as shown, pneumatic coupler 240 suspends the operator compartment within the chassis along a vector F, which extends in generally the same direction as vector D (associated with pneumatic coupler 236 discussed above). Similarly, pneumatic coupler 242 suspends the operator compartment within the chassis along a vector G, which extends in generally the same direction as vector A (associated with pneumatic coupler 230 discussed above).

The pneumatic couplers 230, 232, 234, 236, 238, 240, 242 suspend the operator compartment 220 within the chassis 210. One of ordinary skill in the art would recognize that these pneumatic couplers may include any type of compressed air suspension system. In one embodiment, the pneumatic couplers are air springs. Air springs are a type of air suspension system, also commonly known as air bags. An air spring suspension system may be powered by an electric or engine-driven air pump or compressor. The compressor may pump air into flexible bellows, which may, for example, be made from textile-reinforced rubber. The air pressure may inflate/deflate the bellows and may increase/decrease the distance between the operator compartment 220 and the vehicle chassis 210.

In another embodiment, the pneumatic couplers are pneumatic pistons, which may also be known as pneumatic cylinders. Pneumatic pistons are another type of compressed air suspension system contemplated in the present disclosure. Like air springs, pneumatic pistons may be powered by an electric or engine-driven air pump or compressor, and the pneumatic pistons may be configured to use the power of the compressed gas to produce a force in a reciprocating linear motion to increase/decrease the distance between the operator compartment 220 and the vehicle chassis 210.

Figure 3:
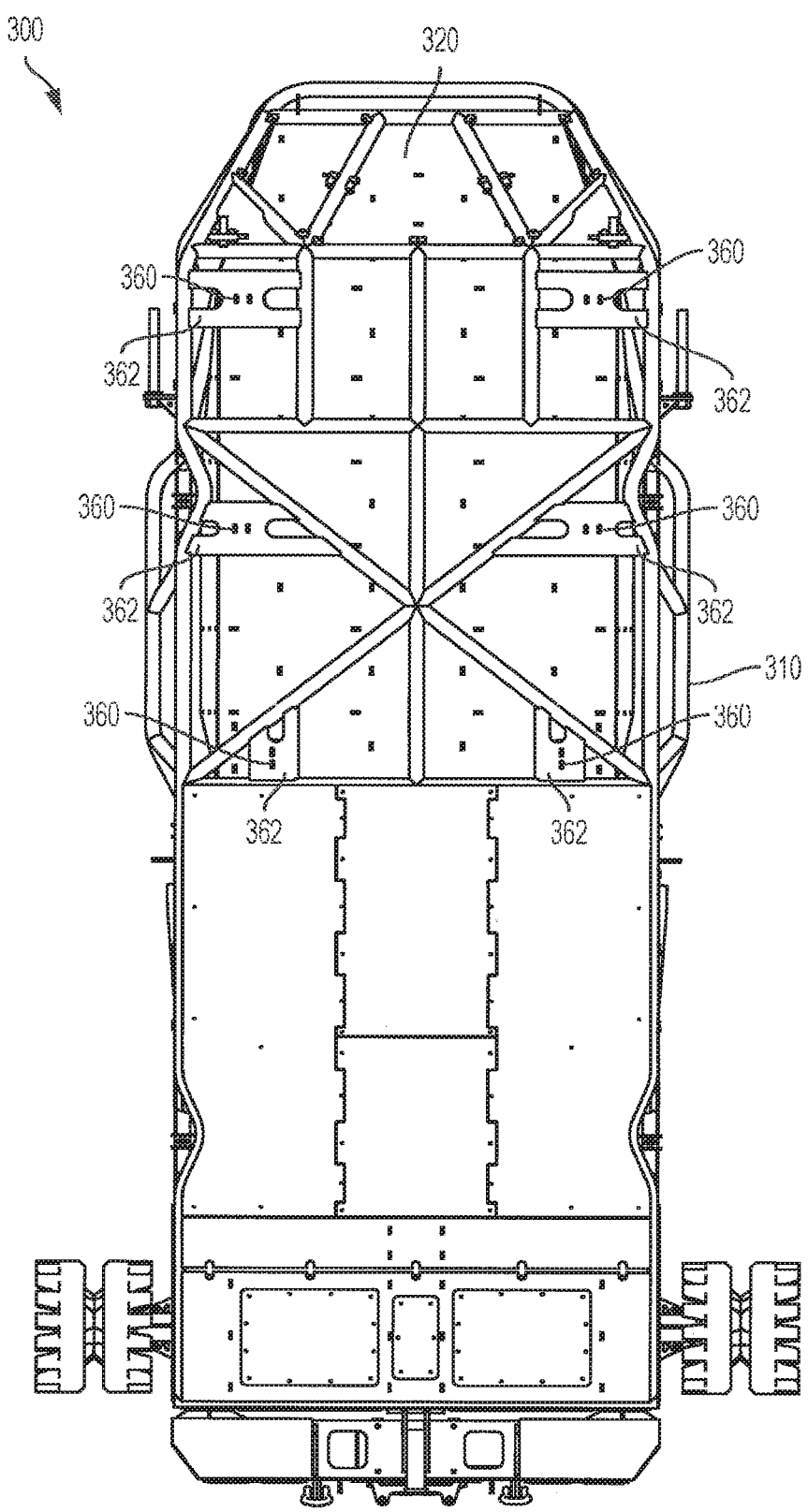
FIG. 3 is a bottom view of an exemplary embodiment of an overland vehicle.
Figure 4:
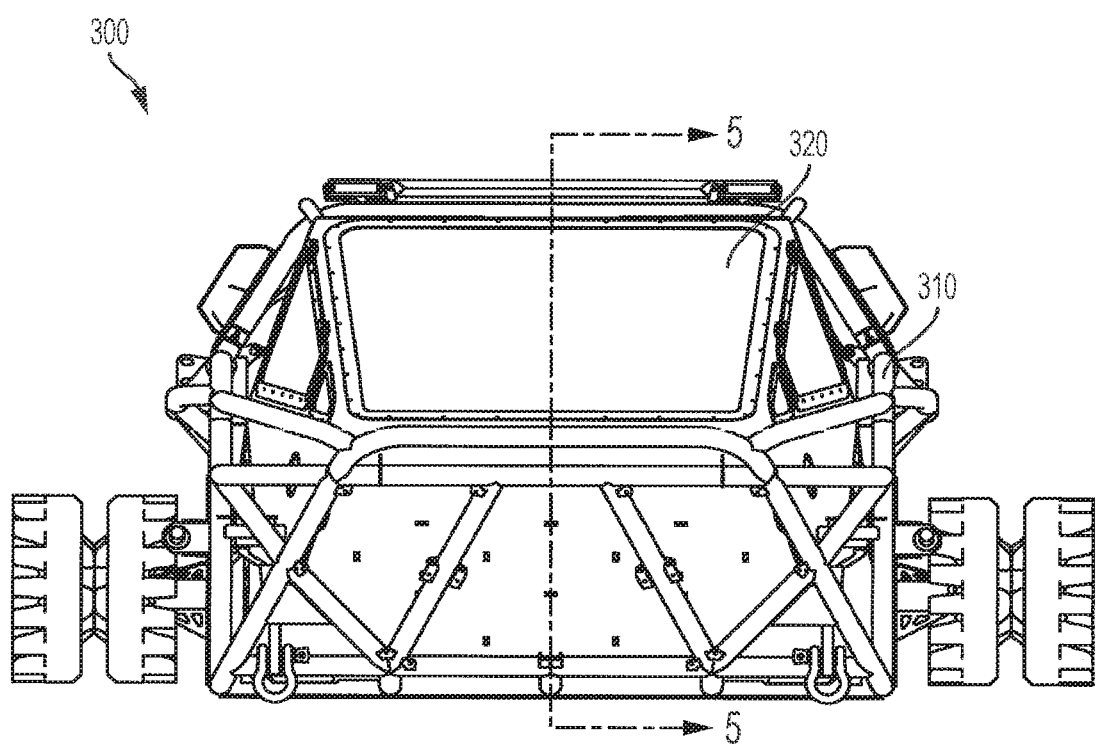
FIG. 4 is a front view of the vehicle illustrated in FIG. 3.

Turning now to FIGS. 3-8, another embodiment of an overland vehicle 300 is illustrated. As shown in FIGS. 3 and 4, the vehicle 300 includes a chassis 310 with a roll-over protection structure, and an operator compartment 320 positioned within the chassis 310. Although not shown in these figures, the vehicle 300 also includes a powertrain coupled to the chassis 310 and a first suspension system configured as a chassis to ground suspension system. Both the powertrain and the first suspension system are discussed above with respect to FIG. 1. As shown in FIG. 3, this vehicle 300 includes a plurality of wheels coupled to the powertrain to selectively move the vehicle 300. As mentioned above, the present disclosure also contemplates one or more tracks coupled to the powertrain to selectively move the vehicle as the disclosure is not so limited.

The vehicle 300 further includes a second suspension system to pneumatically suspend the operator compartment 320 within the chassis 310. As shown in the bottom view in FIG. 3, the second suspension system includes a plurality of pneumatic couplers 360 spaced apart along the bottom side of the chassis 310. In this particular illustrative embodiment, the chassis 310 includes a plurality of brackets 362 which extend within the tube framework of the chassis roll-over protection structure. Centered on each bracket 362 is a pneumatic coupler 360 which may be secured to the bracket 362 with a bolt, screw, or other fastening method known to one of ordinary skill in the art. As shown in this bottom view in FIG. 2, these pneumatic couplers 360 extend into the page (i.e. in a generally upward direction) to suspend the operator compartment 320 to the bottom side of the chassis 310. Countering pneumatic couplers 370 which suspend the operator compartment to the top side of the chassis 310 are shown in FIGS. 5 and 6 and are discussed below.

As shown in FIG. 3, the chassis 310 may include one or more plates that are coupled to the roll-over protection structure. As also shown in FIGS. 3 and 4, the chassis roll-over protection structure includes a plurality of bars which form a framework which may at least partially enclose the operator compartment 320 within the chassis 310. In one illustrative embodiment, the chassis roll-over protection structure fully encloses the operator compartment 320 within the chassis 310. As shown in the front view in FIG. 4, the chassis roll-over protection structure may wrap around the front side of the operator compartment 320.

Figure 5:
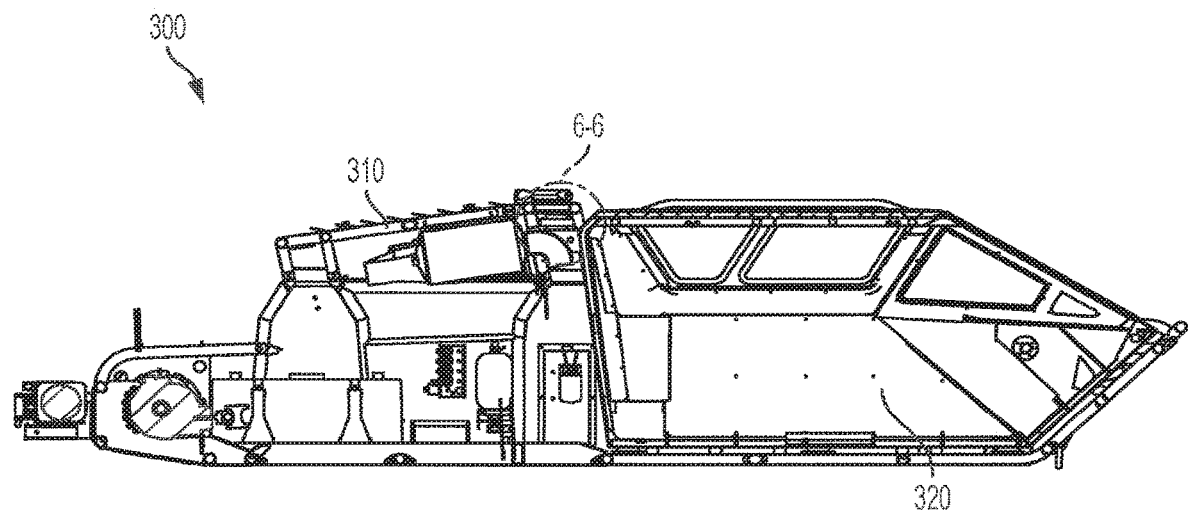
FIG. 5 is a cross-sectional view of the vehicle taken along cut line 5-5 illustrated in FIG. 4.
Figure 6:
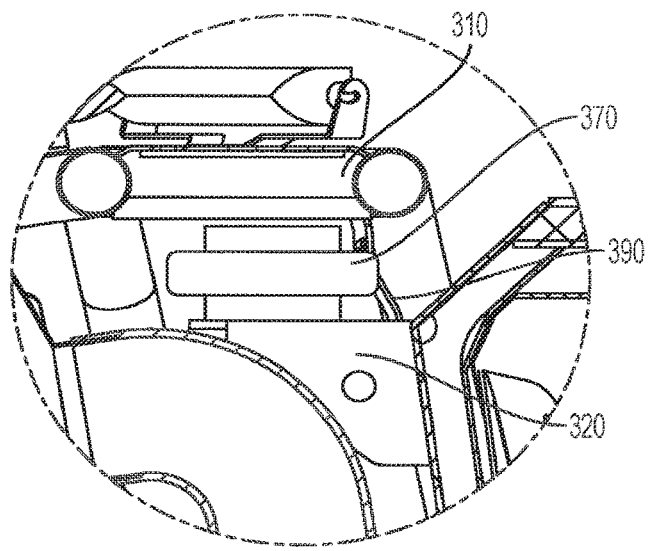
FIG. 6 is a detailed view of the vehicle taken along cut line 6-6 illustrated in FIG. 5.

FIG. 5 illustrates a cross-sectional view of the vehicle 300 taken along line 5-5 illustrated in FIG. 4. This cross-sectional view is taken along the center of the vehicle 300, and the opposite side of the vehicle 300 may be a substantial mirror image thereof. As mentioned above, this vehicle 300 includes a second suspension system to pneumatically suspend the operator compartment 320 within the chassis 310. As shown in FIG. 5, and as also shown in the detailed view shown in FIG. 6, the second suspension system includes a pneumatic coupler 370 positioned along the top side of the chassis 310. As shown in this side view in FIGS. 5 and 6, this pneumatic coupler 370 extends downwardly from the chassis 310 toward the operator compartment (i.e. in a generally downward direction) to suspend the operator compartment 320 to the top side of the chassis 310. As mentioned above, the opposite side of the vehicle 300 may be a mirror image of that shown in FIGS. 5 and 6. Accordingly, the second suspension system may include another spaced apart pneumatic coupler 370 suspending the operator compartment 320 to the top side of the chassis 310. Brackets (not shown) similar to the brackets 362 shown in FIG. 3 may be provided to secure the pneumatic couplers to the chassis 310.

In one illustrative embodiment, it is contemplated that the operator compartment 320 is only suspended within the chassis 310 with the plurality of pneumatic couplers 360, 370. In other words, there are no mechanical connections between the operator compartment 320 and the chassis 310. In one embodiment, as a safety feature, a backup system is provided to provide a mechanical connection coupling the operator compartment 320 to the chassis 310 in the event of pneumatic coupler failure. As shown in FIGS. 5-8, in one embodiment, the backup system includes a plurality of limit straps 390. These limit straps 390 may be spaced around the operator compartment 320 in the event that one or more of the pneumatic couplers fail. These limit straps 390 secure the operator compartment 320 to the chassis 310 and will prevent the operator compartment 320 from coming into contact with the chassis 310 to prevent vehicle damage. One of ordinary skill in the art will recognize that during normal operation, this backup system may be designed to not affect the second suspension system's ability to pneumatically suspend the operator compartment within the chassis. In other words, the limit straps in this backup system may be designed to have additional slack along its length such that the straps 390 are only taut (i.e. in a stretched out configuration) in the event of pneumatic coupler failure.

Figure 7:
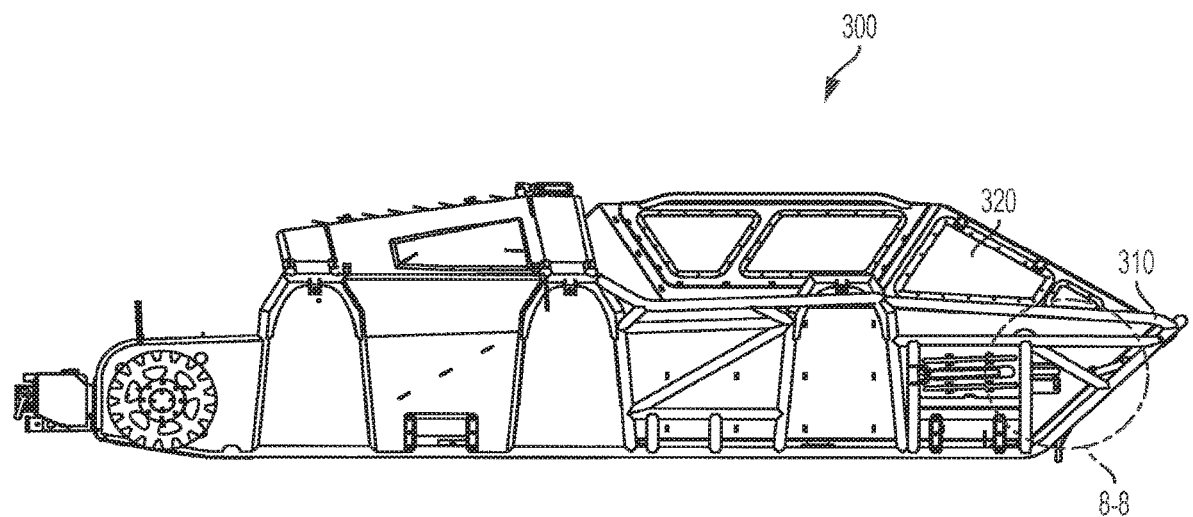
FIG. 7 is a right side view of the vehicle illustrated in FIG. 3.
Figure 8:
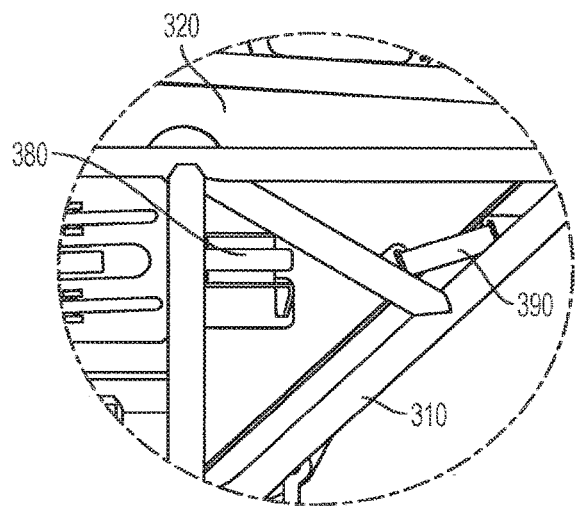
FIG. 8 is a detailed view of the vehicle taken along cut line 8-8 illustrated in FIG. 7.

Turning now to FIGS. 7 and 8, the vehicle 300 may include additional pneumatic couplers configured to pneumatically suspend the operator compartment 320 within the chassis 310. FIG. 7 is a right side view of the vehicle illustrated in FIG. 3. It should be appreciated that the left side view may be a mirror image thereof. Furthermore, FIG. 8 is a detailed view of the vehicle taken along line 8-8 illustrated in FIG. 7. As shown in FIG. 7, and as also shown in the detailed view shown in FIG. 8, the second suspension system includes a pneumatic coupler 380 positioned along the front right side of the chassis 310. As shown in these side views in FIGS. 7 and 8, this pneumatic coupler 380 extends into the page (i.e. in a generally left direction) to suspend the operator compartment 320 to the right side of the chassis 310.

As mentioned above, the opposite side of the vehicle 300 is a mirror image of that shown in FIGS. 7 and 8. Accordingly, the second suspension system may include another spaced apart pneumatic coupler 380 suspending the operator compartment 320 to the front left side of the chassis 310. These left and right side countering pneumatic couplers 380 suspend the operator compartment 320 to the chassis 310 along first and second vectors which extend generally in opposite left and right directions.

In one illustrative embodiment, the second suspension system is configured to pneumatically suspend the operator compartment 320 within the chassis 310 such that the operator compartment is positioned between a first side and a second side of the chassis. The second suspension system includes a plurality of spaced apart pneumatic couplers, including at least a first pneumatic coupler suspending the operator compartment 320 to the first side of the chassis 310 and a second pneumatic coupler suspending the operator compartment 320 to the second side of the chassis 310.

In one illustrative embodiment, the first side of the chassis is generally opposite the second side of the chassis such that the second pneumatic coupler counters the first pneumatic coupler. For example, one of the first pneumatic couplers 360 (shown in FIG. 3 on the lower portion of the chassis) counters one of the second pneumatic couplers 370 (shown in FIGS. 5 and 6 on the upper portion of the chassis). In another embodiment, the first pneumatic coupler 380 (shown in FIG. 8 on the front right portion of the chassis) counters the second pneumatic coupler 380 (positioned on the front left portion of the chassis, as the left side of the chassis may be a mirror image to FIG. 8). The disclosure also contemplates a configuration where a first pneumatic coupler is positioned on a front portion of the chassis and a countering second pneumatic coupler is positioned on a rear portion of the chassis (as shown in FIG. 2).

In one embodiment, the chassis 410 further includes at least a third side and a fourth side, and the second suspension system further includes a third pneumatic coupler suspending the operator compartment to the third side of the chassis, and a fourth pneumatic coupler suspending the operator compartment to the fourth side of the chassis. For example, as shown in FIGS. 3-8, the first pneumatic coupler 370 is positioned on an upper portion of the chassis 310 and the second pneumatic coupler 360 is positioned on a lower portion of the chassis 310, and wherein the third pneumatic coupler 380 is positioned on a right portion of the chassis and the fourth pneumatic coupler 380 is positioned on a left portion of the chassis (when left view is a mirror image of the right view shown in FIGS. 7 and 8).

Furthermore, in one embodiment, it is contemplated that the chassis 310 also includes at least a fifth side and a sixth side, where the second suspension system further includes a fifth pneumatic coupler positioned on a front portion of the chassis and the sixth pneumatic coupler positioned on a rear portion of the chassis (see FIG. 2 for operator compartment pneumatically suspended within a chassis on all six sides of the chassis).

In another embodiment, the first and second countering pneumatic couplers are positioned on opposing sides of the chassis where the first side of the chassis 310 may be substantially perpendicular to the second side of the chassis. For example, turning back to FIG. 2, the first pneumatic coupler 230 suspends the operator compartment 220 to a first side of the chassis, and a second countering pneumatic coupler 234 suspends the operator compartment 220 to a second side of the chassis. By suspending the operator compartment 220 from pneumatic couplers positioned on multiple sides of the chassis, unwanted movement of the operator compartment may be minimized as the vehicle is driven over uneven terrain.

In the particular embodiment illustrated in FIGS. 3-8, there are six pneumatic couplers 360 extending from the bottom side of the chassis, two pneumatic couplers 370 extending from the top side of the chassis (the pneumatic coupler 370 shown in FIG. 6 as well as the additional pneumatic coupler shown in the left view which is a mirror image of FIG. 6), and two pneumatic couplers 380 extending from the front side of the chassis (the pneumatic coupler 380 shown in FIG. 8 on the front right side of the chassis as well as the additional pneumatic coupler shown in the left view which is a mirror image of FIG. 8). One of ordinary skill in the art will recognize that it may be desirable to space apart the pneumatic couplers to disperse the weight of the operator compartment as well as to control the unwanted movement of the operator compartment.

Figure 9:
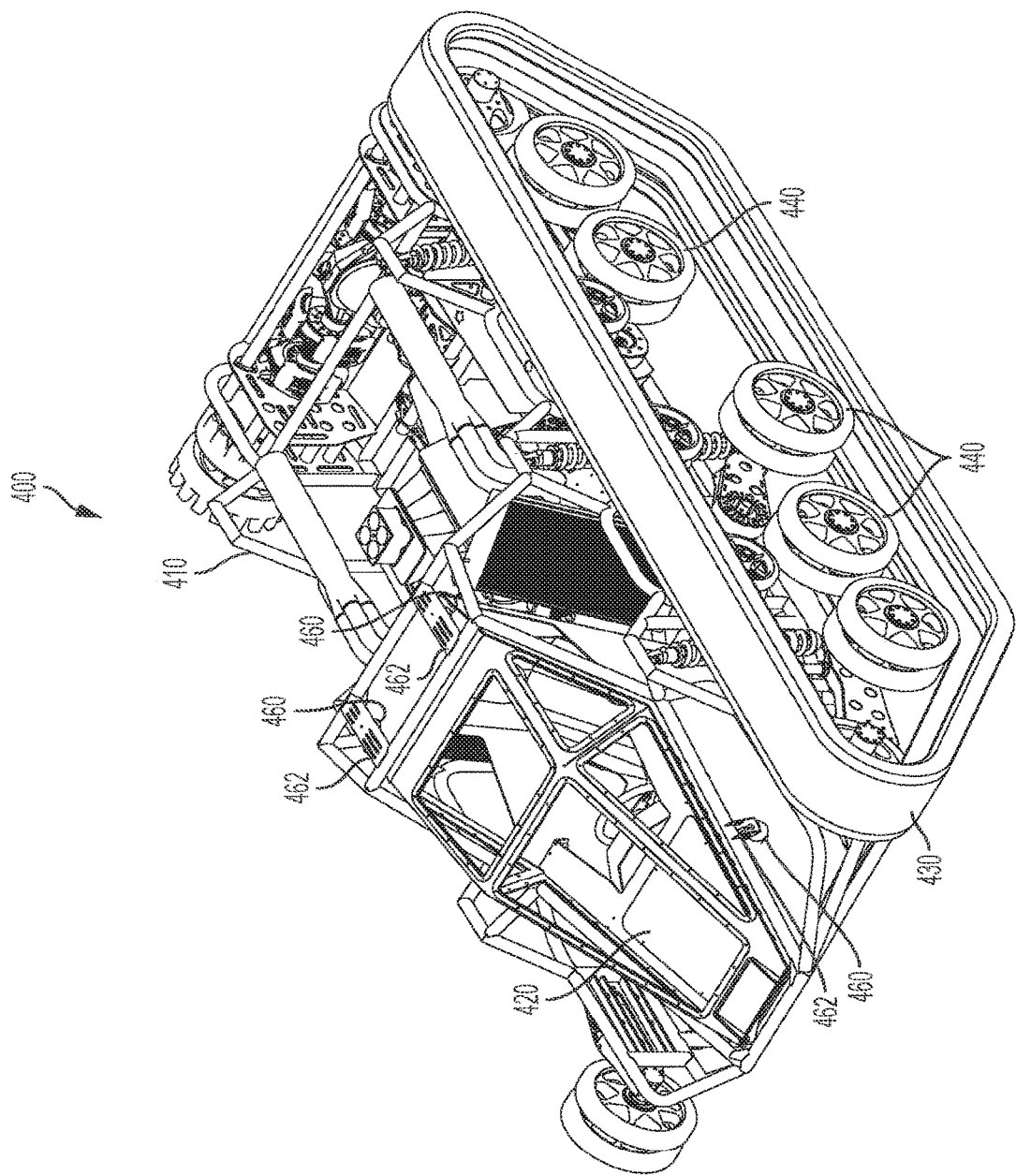
FIG. 9 is a schematic perspective view of another exemplary embodiment of an overland vehicle.

Turning now to FIG. 9, another embodiment of an overland vehicle 400 is illustrated. Like the above described embodiments, the vehicle 400 includes an operator compartment 420 that is pneumatically suspended within a chassis 410, where the chassis includes a roll-over protection structure. The vehicle 400 further includes a powertrain, a chassis to ground suspension system, as well as a plurality of wheels 440 and tracks 430 coupled to the powertrain to move the vehicle, and all of these components are discussed above.

The vehicle 400 also includes a second suspension system configured to pneumatically suspend the operator compartment 420 within the chassis 410. The second suspension system includes a plurality of spaced apart pneumatic couplers 460 including two pneumatic couplers 460 suspending the operator compartment 420 to a top side of the chassis, and another pneumatic coupler 460 suspending the operator compartment to a front left side of the chassis. Although not visible in FIG. 9, an identical pneumatic coupler may be provided on the front right side of the chassis 410. Furthermore, the vehicle 400 may include one or more pneumatic couplers 460 on the bottom side of the chassis 410, which may be similar to the configuration shown in FIG. 3. As shown in FIG. 9, the chassis 410 may include a plurality of brackets 462 which are coupled to the chassis framework. As shown in FIG. 9, centered on each bracket 462 is a pneumatic coupler 460 which may be secured to the bracket 462 with a bolt, screw, or other fastening method known to one of ordinary skill in the art. These pneumatic couplers 460 extend from the chassis 410 to the operator compartment 420 to suspend the operator compartment 420 to multiple sides of the chassis 410.

The above described suspension system between the operator compartment and the chassis can be implemented in a variety of types of vehicles, including but not limited to various commercial, military and construction vehicles. Exemplary vehicles include, but are not limited to trucks, tractors, bulldozers, bucket loaders, dump trucks, cranes, excavators, armored vehicles, tanks, combat vehicles, utility vehicles, etc.

The foregoing detailed description has been presented for the purposes of illustration and description. It is not intended to be exhaustive or to limit the invention to the particular disclosed embodiments. Numerous variations and configurations will be apparent in light of this disclosure. Thus its intended that the scope of the invention be defined not be this detailed description, but rather by the claims appended hereto.

What is claimed is:

1. An overland vehicle comprising:
a chassis including a roll-over protection structure;
a powertrain coupled to the chassis, wherein the powertrain is configured to generate power to drive the overland vehicle;
a first suspension system configured as a chassis to ground suspension system;
an operator compartment; and
a second suspension system configured to pneumatically suspend the operator compartment within the chassis, wherein the second suspension system includes a plurality of pneumatic couplers, including at least a first pneumatic coupler suspending the operator compartment to the chassis along a first vector extending in a generally upward direction, and a second countering pneumatic coupler suspending the operator compartment to the chassis along a second vector extending in a generally opposite downward direction.

2. The overland vehicle recited in claim 1, wherein the plurality of pneumatic couplers of the second suspension system further includes at least a third pneumatic coupler suspending the operator compartment to the chassis along a third vector that extends in a generally fore direction and a fourth countering pneumatic coupler suspending the operator compartment to the chassis along a fourth vector that extends in a generally opposite aft direction.

3. The overland vehicle recited in claim 2, wherein the plurality of pneumatic couplers of the second suspension system further includes at least a fifth pneumatic coupler suspending the operator compartment to the chassis along a fifth vector that extends in a generally left direction and a sixth countering pneumatic coupler suspending, the operator compartment to the chassis along a sixth vector that extends in a generally opposite right direction.

4. The overland vehicle recited in claim 1, wherein the second suspension system further includes at least a third pneumatic coupler suspending the operator compartment to the chassis along a third vector extending in a third direction, and a fourth countering pneumatic coupler suspending the operator compartment to the chassis along a fourth vector extending in a fourth direction, wherein the fourth direction is generally opposite the third direction.

5. The overland vehicle recited in claim 4, wherein the third vector extends in a generally left direction and the fourth vector extends in a generally opposite right direction.

6. The overland vehicle recited in claim 1, further comprising:
a plurality of wheels coupled to the powertrain, wherein the plurality of wheels are configured to selectively move the overland vehicle.

7. The overland vehicle recited in claim 1, further comprising:
a plurality of tracks coupled to the powertrain, wherein the plurality of tracks are configured to selectively move the overland vehicle.

8. The overland vehicle recited in claim 1, wherein the plurality of pneumatic couplers includes a plurality of air springs.

9. The overland vehicle recited in claim 1, wherein the plurality of pneumatic couplers includes a plurality of pneumatic pistons.

10. An overland vehicle comprising:
a chassis including a roll-over protection structure having a plurality of sides, including at least a first side and a second side;
a powertrain coupled to the chassis, wherein the powertrain is configured to generate power to drive the overland vehicle;
a first suspension system configured as a chassis to ground suspension system;
an operator compartment; and
a second suspension system configured to pneumatically suspend the operator compartment within the chassis such that the operator compartment is positioned between the first side and the second side of the chassis, wherein the second suspension system includes a plurality of spaced apart pneumatic couplers, including at least a first pneumatic coupler positioned on an upper portion of the chassis and suspending the operator compartment to the first side of the chassis, and a second pneumatic coupler positioned on a lower portion of the chassis and suspending the operator compartment to the second side of the chassis, wherein the first side of the chassis is generally opposite the second side of the chassis such that the second pneumatic coupler counters the first pneumatic coupler.

11. The overland vehicle recited in claim 10, wherein the plurality of spaced apart pneumatic couplers further includes a third pneumatic coupler positioned on a front portion of the chassis and a fourth pneumatic coupler positioned on a rear portion of the chassis.

12. The overland vehicle recited in claim 10, wherein the plurality of spaced apart pneumatic couplers further includes a left pneumatic couplers positioned on a left portion of the chassis and a right pneumatic coupler positioned on a right portion of the chassis.

13. The overland vehicle recited in claim 10, wherein the chassis further includes at least a third side and a fourth side, and wherein the second suspension system further comprises a third pneumatic coupler suspending the operator compartment to the third side of the chassis, and a fourth pneumatic coupler suspending the operator compartment to the fourth side of the chassis.

14. The overland vehicle recited in claim 13, wherein the third pneumatic coupler is positioned on a right portion of the chassis and the fourth pneumatic coupler is positioned on a left portion of the chassis.

15. The overland vehicle recited in claim 10, further comprising:
a plurality of wheels coupled to the powertrain, wherein the plurality of wheels are configured to selectively move the overland vehicle.

16. The overland vehicle recited in claim 10, wherein the plurality of pneumatic couplers includes a plurality of air springs.

17. The overland vehicle recited in claim 10, wherein the plurality of pneumatic couplers includes a plurality of pneumatic pistons.

* * * * *